United States Patent
Osterfeld et al.

(10) Patent No.: US 9,205,801 B2
(45) Date of Patent: Dec. 8, 2015

(54) AIRBAG MODULE INCLUDING AIRBAG WITH DIFFUSER

(71) Applicant: TK HOLDINGS INC., Auburn Hills, MI (US)

(72) Inventors: Douglas Lee Osterfeld, Waterford, MI (US); Richard Andrew Wiik, Fort Gratiot, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/321,285

(22) Filed: Jul. 1, 2014

(65) Prior Publication Data

US 2015/0014973 A1    Jan. 15, 2015

Related U.S. Application Data

(60) Provisional application No. 61/844,686, filed on Jul. 10, 2013.

(51) Int. Cl.
    *B60R 21/262*    (2011.01)
(52) U.S. Cl.
    CPC .................. *B60R 21/262* (2013.01)
(58) Field of Classification Search
    CPC ..................................... B60R 21/262
    USPC ....................................... 280/740
    See application file for complete search history.

(56) References Cited

U.S. PATENT DOCUMENTS

| | | | | |
|---|---|---|---|---|
| 6,811,184 B2 * | 11/2004 | Ikeda et al. | | 280/742 |
| 6,962,364 B2 * | 11/2005 | Ju et al. | | 280/730.2 |
| 7,963,556 B2 * | 6/2011 | Loos et al. | | 280/740 |
| 8,007,003 B2 * | 8/2011 | Kalandek | | 280/740 |
| 8,235,415 B2 * | 8/2012 | Gamill et al. | | 280/730.2 |
| 8,342,571 B2 * | 1/2013 | Baumgartner et al. | | 280/740 |
| 8,851,508 B1 * | 10/2014 | Rickenbach et al. | | 280/729 |
| 2004/0104561 A1 * | 6/2004 | Maertens | | 280/730.2 |
| 2006/0255570 A1 | 11/2006 | Wipasuramonton et al. | | |
| 2007/0145730 A1 * | 6/2007 | Choi | | 280/740 |
| 2007/0200327 A1 * | 8/2007 | Kloss et al. | | 280/740 |
| 2009/0295134 A1 * | 12/2009 | Wold et al. | | 280/741 |
| 2010/0084841 A1 * | 4/2010 | Suemitsu et al. | | 280/730.2 |
| 2010/0164209 A1 * | 7/2010 | Magnin et al. | | 280/740 |
| 2010/0225098 A1 * | 9/2010 | Baumgartner et al. | | 280/736 |
| 2010/0276917 A1 * | 11/2010 | Chavez et al. | | 280/740 |
| 2012/0313359 A1 * | 12/2012 | Chavez et al. | | 280/740 |
| 2013/0200596 A1 * | 8/2013 | Goto et al. | | 280/728.2 |
| 2014/0125041 A1 * | 5/2014 | Kalandek | | 280/740 |

OTHER PUBLICATIONS

International Search Report dated Oct. 31, 2014 issued in PCT/US2014/045069.
Written Opinion dated Oct. 31, 2014 issued in PCT/US2014/045069.

* cited by examiner

*Primary Examiner* — Nicole Verley
(74) *Attorney, Agent, or Firm* — Gordon & Rees LLP

(57) ABSTRACT

An airbag module includes an inflatable cushion, an inflator configured to provide inflation gas for inflating the cushion, and a diffuser for directing the inflation gas from the inflator into the airbag. The diffuser is tubular and includes a first opening at one end for connecting to the inflator. The diffuser includes second and third openings located at the other end of the diffuser so that inflation gas is distributed into the inflatable cushion in two different directions.

19 Claims, 4 Drawing Sheets

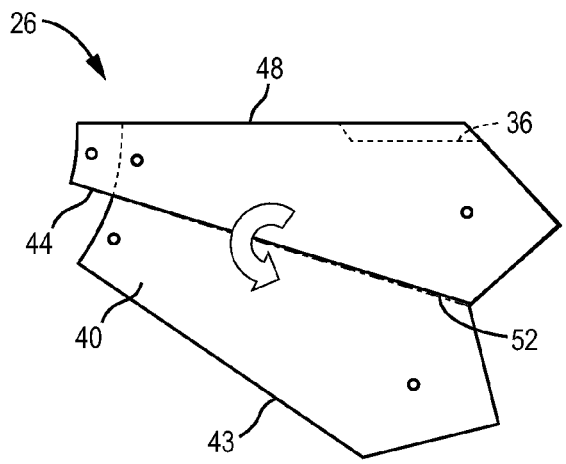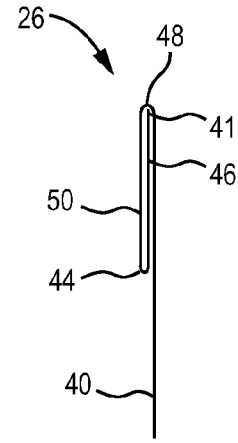
FIG. 6A  FIG. 6B
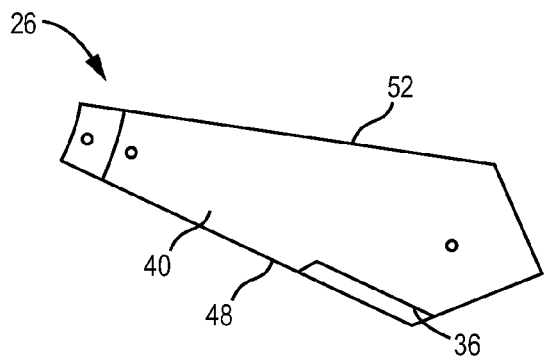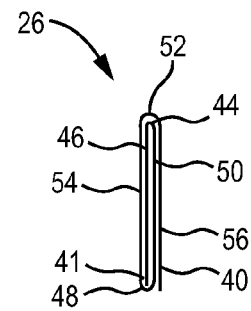
FIG. 7A  FIG. 7B
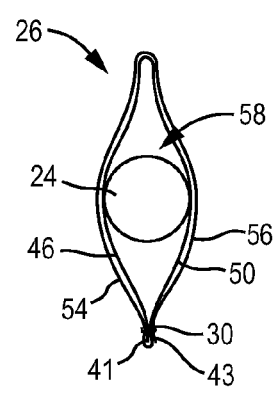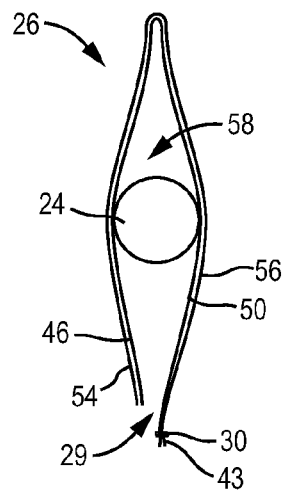
FIG. 8  FIG. 9

AIRBAG MODULE INCLUDING AIRBAG WITH DIFFUSER

CROSS REFERENCE TO RELATED APPLICATIONS

This application claims priority to and the benefit of U.S. Provisional Application No. 61/844,686, filed Jul. 10, 2013, which is incorporated herein by reference in its entirety.

BACKGROUND

The present application relates generally to the field of vehicle airbags. More specifically, the application relates to a deflector or diffuser for an inflatable airbag for deflecting and distributing inflation gas emitted from an inflator into the airbag.

An inflatable airbag that uses an inflation device that generates gas through pyrotechnic ignition, stored gas or combination thereof typically requires diffusion of the gas into an airbag cushion to properly inflate the cushion and preserve the integrity of the cushion fabric. In a typical inflatable airbag, the inflation device ignites to burn a solid propellant, which turns to liquid and then to gas in order to inflate the airbag cushion. The need for a diffuser is especially apparent in high pressure systems, fast deploying systems, or systems where gas generation creates large amounts of heat and/or particulate from the combustion process.

Traditional diffusers may be constructed from multiple components and may include multiple seams. The additional components and seams can represent an increase in the manufacturing time and cost of the diffuser.

SUMMARY

One embodiment of the invention relates to an airbag module including an inflatable cushion, an inflator configured to provide inflation gas for inflating the cushion, and a diffuser for directing the inflation gas from the inflator into the airbag. The diffuser is tubular and includes a first opening at one end for connecting to the inflator. The diffuser includes second and third openings located at the other end of the diffuser so that inflation gas is distributed into the inflatable cushion in two different directions Another embodiment of the invention relates to an airbag assembly including an inflatable airbag cushion, an inflator for providing inflation gas to the cushion, and a sleeve shaped diffuser. The diffuser is connected at one end to a conduit for carrying inflation gas to the airbag cushion. The diffuser includes a pair of openings at the opposite end of the sleeve from the conduit so that inflation gas may be distributed in two different directions into the airbag cushion.

Another embodiment of the invention relates to a module containing a side curtain airbag for protecting an occupant of a vehicle. The module includes the side curtain airbag, an inflator for providing inflation gas for the airbag, and a diffuser. The diffuser distributes inflation gas from the inflator into the airbag. The diffuser includes a pair of openings for distributing the inflation gas in both the fore and aft directions of the airbag.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 5A-7B are side and front views of a folding process for the fabric diffuser of FIG. 3, according to an exemplary embodiment.

FIG. 8 is a schematic cross-section view of the fabric diffuser of FIG. 3, taken along line 8-8.

FIG. 9 is a schematic cross-section view of the fabric diffuser of FIG. 3, taken along line 9-9.

DETAILED DESCRIPTION

Figure 1A:
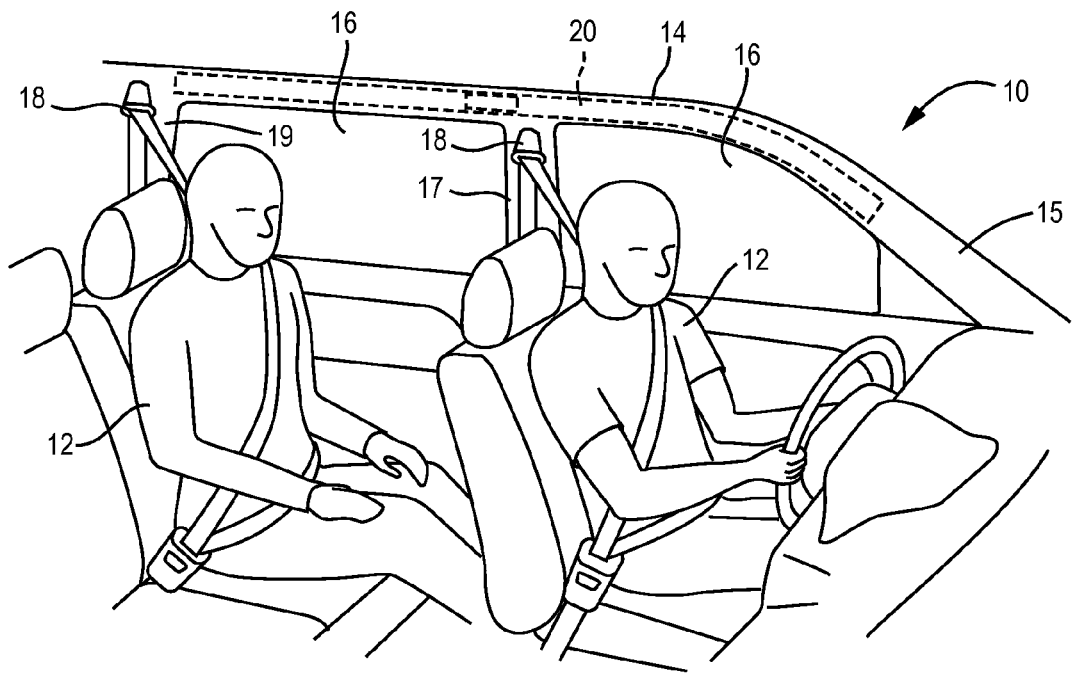
FIG. 1A is a is a perspective view of the interior of a vehicle, according to an exemplary embodiment.
Figure 1B:
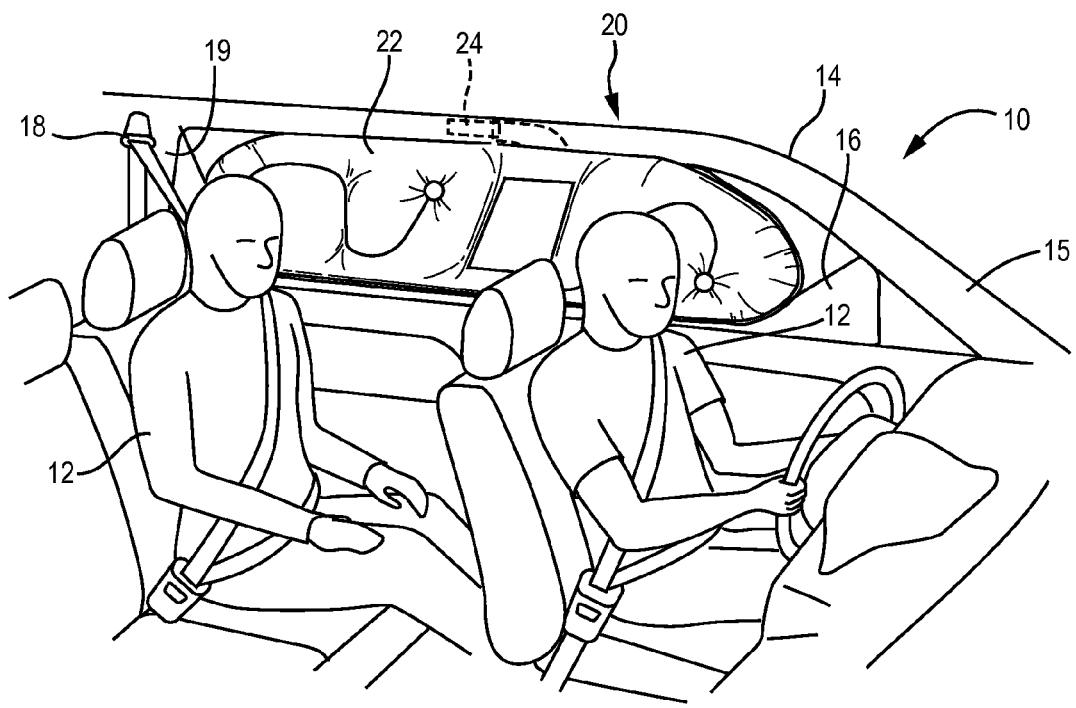
FIG. 1B is a is a perspective view of a head side impact airbag device deployed in the interior of a vehicle, according to an exemplary embodiment.

Referring to FIGS. 1A and 1B, a perspective view of a vehicle interior 10 (e.g., occupant compartment, etc.) is shown according to an exemplary embodiment. An airbag device, shown as a head-side airbag (HSAB) module 20 is positioned in a roof rail 14 of the vehicle. The HSAB module 20 may include an airbag cushion 22 inflated by a gas generator or inflator 24 and at least one connection element coupled between the airbag cushion 22 and a structural member of the vehicle, such as the roof rail 14 above a window opening 16, in a conventional manner. In other embodiments, the inflator may be mounted in the vicinity of the pillars of the vehicle frame (e.g., the A pillar 15, B pillar 17 or the C pillar 19). Thus, the inflator may be considered a rear or mid mount inflator depending on vehicle configuration and desired airbag deployment characteristics. The airbag cushion 22 is preferably secured in a folded state beneath a trim panel (not shown). The trim panel is snapped, screwed, or otherwise secured in place over the inflator and the packed, folded curtain airbag cushion 22.

Referring to FIG. 1B, during a side impact, roll over, frontal impact or frontal offset impact event involving the vehicle, sensors trigger the gas generator or inflator 24, which may be located in the roof rail 14 or roof assembly, to rapidly generate and force gas into the airbag cushion 22. The airbag cushion 22 deploys downwardly away from a storage position and along the side of the vehicle interior 10 toward the vehicle occupants 12 to a deployed position. The airbag cushion 22 expands in the cross-car direction as gas is forced into the cushion 22 by the inflator. In the deployed position, the airbag cushion 22 is disposed between the occupants 12 and the side of the vehicle and generally covers at least a portion of the window openings 16.

The airbag cushion 22 is generally formed from a first panel (e.g., inboard panel, inner panel, front panel, etc.) and a second panel (e.g., outboard panel, outer panel, rear panel, etc.) that are coupled together by a plurality of sewn seams. According to an exemplary embodiment, the first panel and the second panel are a nylon fabric. The panels may be sewn together or secured by other suitable methods such as thermobonding or welding. The panels and the connecting seams may be coated with a sealant in order to reduce the leakage of inflation gas. The airbag cushion 22 may be divided into two or more compartments or chambers. Passages or ports may be provided between individual chambers such that the chambers are in fluid communication with each other. The curtain airbag cushion 22 may also include a plurality of un-inflated portions such as un-inflated portions that generally separate the chambers.

Figure 2:
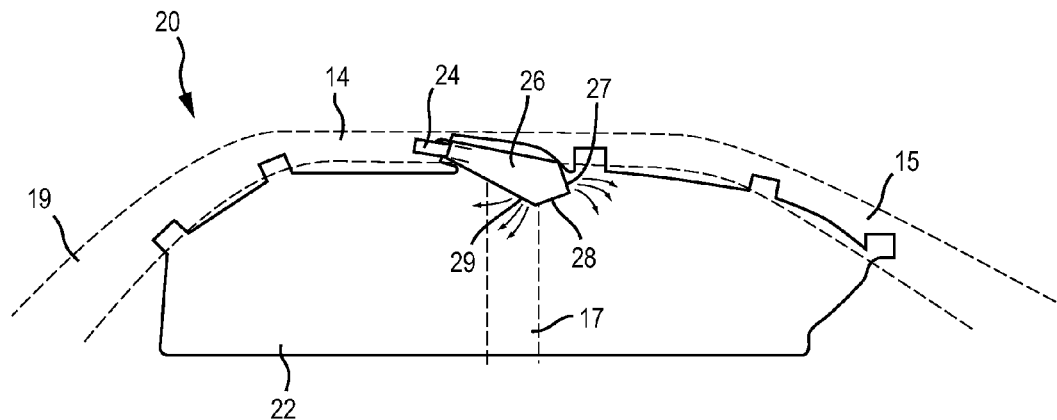
FIG. 2 is a side view of an airbag device in an uninflated state with the inboard panel removed, according to an exemplary embodiment.

Referring now to FIG. 2, the airbag cushion 22 is shown in a deployed state with the first panel hidden to show the interior of the airbag cushion 22. According to an exemplary embodiment, a diffuser 26 is coupled to the inflator 24. The inflator 24 may include a conduit portion for carrying the inflation gas from a gas generating portion of the inflator 24 to the airbag cushion 22. The diffuser 26 is provided between the inflator 24 and the airbag cushion 22. The diffuser 26 may be connected at one end to the conduit portion of the inflator 24 and directs the inflation gas from the conduit portion of the inflator 24 to the interior of the airbag cushion 22. The diffuser 26 diffuses the gas into the airbag cushion 22 to properly inflate the cushion and preserve the integrity of the cushion fabric. The diffuser 26 is especially desirable in high pressure systems, fast deploying systems, or systems where gas generation creates large amounts of heat and/or particulate from the combustion process. Such diffusers 26 generally include a blocking or deflection portion 28 that provides a surface that is generally perpendicular to the path of the gas from the inflator 24. The gas is then redirected through at least two outlet passages 27, 29 to the interior of the airbag cushion 22 to inflate the airbag cushion 22. The outlet passages or openings 27, 29 maybe positioned so that inflation gas is directed in both the fore and aft directions of the cushion. The portion of the diffuser 26 located between the openings may be configured to block the inflation gas and trap the particulate byproducts that are carried by the inflation gas because the particulates generally will not change direction to exit the openings with the stream of inflation gas. Thus, the diffuser 26 may be configured to both diffuse and direct the inflation gas and trap particulate byproduct, if any, generated by the inflator 24. In addition, the diffuser 26 may function as a heat shield if the gas being introduced into the airbag is at a high temperature.

Figure 3:
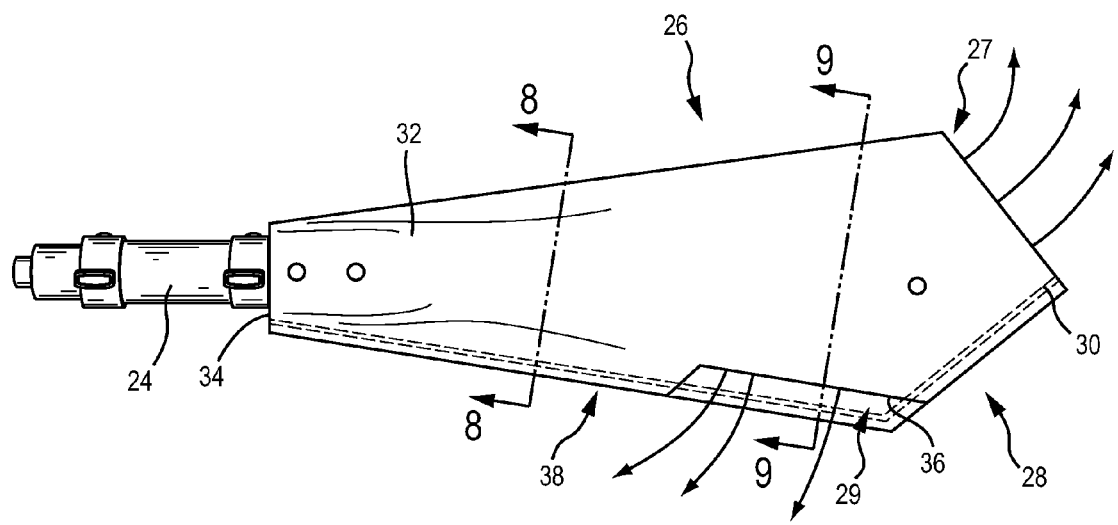
FIG. 3 is a side view of a fabric diffuser, according to an exemplary embodiment.
Figure 4:
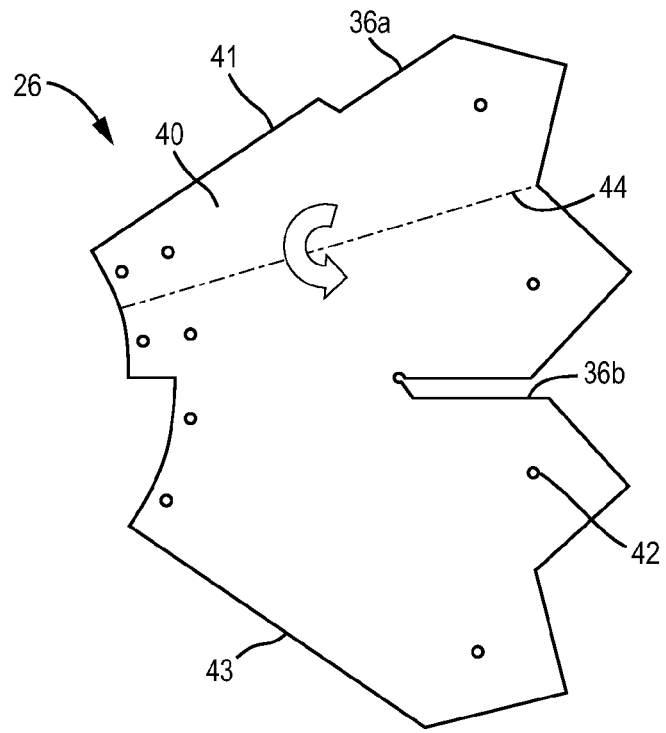
FIG. 4 is a plan view of an unassembled fabric diffuser, according to an exemplary embodiment.

Referring to FIG. 3, the diffuser 26 is shown in more detail. According to an exemplary embodiment, the diffuser 26 is a simplified diffuser that is formed from a single piece of fabric with a single stitched seam 30 running along a portion of the periphery of the diffuser 26 to form a tubular (e.g., tube-like) sleeve structure. The seam 30 may be continuous in order to improve the manufacturability of the diffuser. The seam 30 may be sewn while the diffuser fabric is laid flat. The inflator 24 is received in a narrow neck 32 of the diffuser 26 through an opening 34. The seam 30 closes an end of the diffuser 26 opposite the opening 34, creating the deflection portion 28 configured to redirect the flow of gas from the inflator 24. A portion of the diffuser 26 is left open to form the first opening 27 configured to allow gas to escape the diffuser. The second opening 29 is formed by cutouts 36 in the diffuser 26. The first opening 27 and the second opening 29 are positioned such that the inflation gas is distributed into the interior of the airbag cushion 22 through the openings 27 and 29 in two different directions. In one embodiment, the inflation gas is distributed through the second opening 29 in a direction substantially opposite of the direction the inflation gas is distributed through the first opening 27.

In one embodiment, the diffuser 26 may have a substantially frusto-conical shape with the neck 32 being formed by a first end of the diffuser 26 having a width that is less than the width of the second or distal end of the diffuser 26 (e.g., the end proximate the openings 27 and 29 and the deflection portion 28). In other embodiments, the diffuser 26 may be have substantially cylindrical shape with a relatively constant width along the length of the diffuser 26.

The force of the inflation gas in the diffuser 26 may create significant stresses in the seam 30. According to an exemplary embodiment, the seam 30 is loaded in tension in high stress areas 38 adjacent to the opening 29. The seam 30 may rupture (e.g., tear, break, unravel, etc.) in the high stress areas 38 under high loads during inflation of the airbag cushion 22 without compromising the overall structural integrity of the diffuser 26. The diffuser is configured so that the rupture of the seam 30 merely enlarges the adjacent opening 29, which does not significantly change the performance characteristics of the inflating airbag module. Thus, the airbag module may be constructed so that under certain conditions (e.g., higher temperature environments) that may subject the diffuser to higher pressures it is acceptable for the seam 30 to rupture, while not compromising the performance the airbag.

Referring now to FIGS. 4-9B, according to an exemplary embodiment, the diffuser 26 is formed from a single fabric member 40. The unfolded fabric member 40 is generally trapezoidal in shape with a top edge 41 and a bottom edge 43. The fabric member 40 is folded upon itself to form a generally frusto-conical sleeve. The fabric member 40 may include alignment features, shown as holes 42, to facilitates the folding of the diffuser 26 (e.g., with the alignment features interfacing with a fixture to properly locate the folds). The fabric 40 may a traditional airbag material, such as high strength nylon. Because it is formed from a flexible fabric material, the diffuser 26 can be folded into a compact package with the airbag cushion 22 when the airbag module 20 is stowed behind a trim or cover component.

Figure 5A:
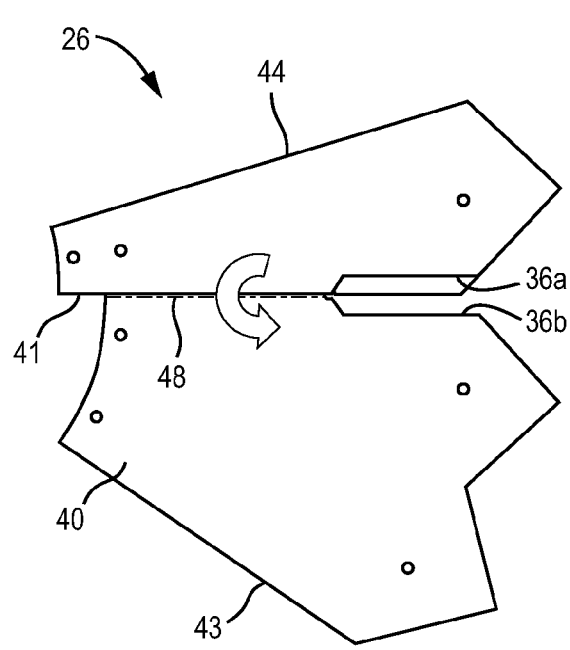
Figure 5B:
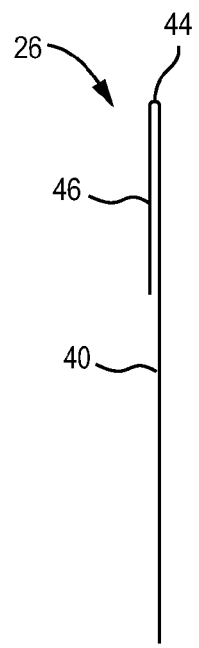

In a first step, the upper portion of the fabric member 40 is folded along a first fold line 44 to form a first layer 46 (see FIG. 5B). A cutout 36a is provided along the top edge 41 of the fabric member 40. In a second step, the fabric member 40 is folded along a second fold line 48 generally coincident with the edge 41 of the first layer 46 to form a second layer 50 (see FIG. 6B). A cutout 36b is provided along the second fold line 48 and is aligned with the cutout 36a when the fabric member 40 is folded along the second fold line 48. In a third step, the fabric member 40 is folded along a third fold line 52 to form a third layer 54 and a fourth layer 56 (see FIG. 7B). The diffuser 26 is formed by coupling the layers 46, 50, 54, and 56 together with the stitched seam 30 along the edges 41 and 43 and the second fold line 48. As shown in FIG. 8, the stitched seam 30 couples together all four layers 46, 50, 54, and 56 in the neck 32 portion of the diffuser 26. As shown in FIG. 9, at the cutouts 36a and 36b, the stitched seam 30 couples only the second layer 50 to the fourth layer 56. The second opening 29 is therefore created between the first layer 46 and the second layer 50. All four layers are also coupled together at the distal end, beyond the cutouts 36a and 36b to form the deflection portion 28. The use of a single continuous stitched seam 30 improves the manufacturability of the airbag. Also, by allowing the seam to open in area 38 adjacent to the opening 29, the diffuser is able to adjust to higher pressures, which may occur at higher temperatures.

The inflator 24 is received between the first layer 46 and the second layer 50 and releases inflation gasses into a central chamber 58. The deflection portion 28 redirects the flow of gasses out of the central chamber 58 through the first opening 27 and the second opening 29. The asymmetrical cutout 36 protects the seam 30 from tension loading. The outward expansion of gasses in the central chamber 58 and the force on the deflection portion 28 may force the seam 30 to rupture in the high stress area 38 but the asymmetrical cutout 36 maintains the integrity of the seam 30 in the deflection portion 28. The construction of the diffuser 26 allows the diffuser to remain intact and functional even if the seam 30 ruptures and the first layer is partially disconnected from the second layer 50 in the high stress area 38.

A diffuser constructed from a single fabric panel and a single stitched seam as described above can represent a cost savings for an airbag module in comparison to traditional diffusers that may include multiple components and additional manufacturing and assembly steps. Further, the simple folding pattern allows the diffuser to be assembled quickly with a high degree of accuracy, resulting in a diffuser that effectively redirects inflation gasses from an inflator into the interior of an airbag cushion.

It is important to note that the construction and arrangement of the fabric diffuser as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag module comprising:
   an inflatable cushion;
   an inflator configured to provide inflation gas for inflating the cushion;
   a diffuser for directing the inflation gas from the inflator into the airbag;
   wherein the diffuser is tubular and includes a first opening at one end for connecting to the inflator, and wherein the diffuser includes second and third openings located at the other end of the diffuser so that inflation gas is distributed into the inflatable cushion in two different directions;
   wherein the diffuser includes a first straight fold line extending between the first and second openings and a second straight fold line extending between the first and third openings;
   wherein the diffuser comprises fabric and wherein at least one of the openings in the diffuser is formed by a cutout portion of the fabric; and
   wherein the fabric is folded so that at least two layers of fabric overlie each other and the cutout portion overlies another cutout portion to form a boundary of the at least one of the openings.

2. The airbag module of claim 1, wherein the other portion of the diffuser includes a blocking portion located between the second and third openings that prevents inflation gas from entering the cushion.

3. An airbag module comprising:
   an inflatable cushion;
   an inflator configured to provide inflation gas for inflating the cushion;
   a diffuser for directing the inflation gas from the inflator into the airbag;
   wherein the diffuser is tubular and includes a first opening at one end for connecting to the inflator, and wherein the diffuser includes second and third openings located at the other end of the diffuser so that inflation gas is distributed into the inflatable cushion in two different directions;
   wherein the diffuser includes a first straight fold line extending between the first and second openings and a second straight fold line extending between the first and third openings;
   wherein the diffuser comprises fabric and wherein at least one of the openings in the diffuser is formed by a cutout portion of the fabric; and
   wherein at least two layers of folded fabric are held in position by only a single continuous seam.

4. The airbag module of claim 3, wherein the seam is configured to rupture at a location adjacent to one of the second and third openings thereby allowing the folded fabric to separate.

5. An airbag module comprising:
   an inflatable cushion;
   an inflator configured to provide inflation gas for inflating the cushion;
   a diffuser for directing the inflation gas from the inflator into the airbag;
   wherein the diffuser is tubular and includes a first opening at one end for connecting to the inflator, and wherein the diffuser includes second and third openings located at the other end of the diffuser so that inflation gas is distributed into the inflatable cushion in two different directions;
   wherein the diffuser includes a first straight fold line extending between the first and second openings and a second straight fold line extending between the first and third openings;
   wherein the diffuser comprises fabric and wherein at least one of the openings in the diffuser is formed by a cutout portion of the fabric; and
   wherein the fabric is folded at least twice and wherein each of the fold lines extends along the length of the tubular diffuser.

6. An airbag assembly comprising:
   an inflatable airbag cushion;
   an inflator for providing inflation gas to the cushion;
   a sleeve shaped diffuser connected at one end to a conduit for carrying inflation gas to the airbag cushion, wherein the diffuser includes a pair of openings at the opposite end of the sleeve from the conduit so that inflation gas may be distributed in two different directions into the airbag cushion;
   wherein the diffuser comprises folded fabric that is folded along a line extending a length of the sleeve shaped diffuser, and wherein the diffuser includes only a single continuous seam for holding the folded fabric in place.

7. The airbag assembly of claim 6, wherein the seam is configured to rupture at a location adjacent to one of the pair of openings thereby allowing the folded fabric to separate.

8. The airbag assembly of claim 6, wherein the diffuser comprises fabric and wherein at least one of the openings in the diffuser is formed by a cutout portion of the fabric.

9. The airbag assembly of claim 8, wherein the fabric includes another cutout portion and wherein the fabric is folded so that the cutout portion overlies the another cutout portion to form the boundary of the at least one of the openings.

10. The airbag assembly of claim 6, wherein the fabric is folded at least twice and wherein each of the fold lines extends along the length of the sleeve shaped diffuser.

11. The airbag assembly of claim 6, wherein the opposite end of the diffuser includes a blocking portion located between the pair of openings, and wherein the blocking portion prevents inflation gas from entering the cushion and is configured to trap particulate that may be carried by the inflation gas.

12. A module containing a side curtain airbag for protecting an occupant of a vehicle, wherein the module comprises:
   the side curtain airbag and an inflator for providing inflation gas for the airbag;
   a diffuser for distributing inflation gas from the inflator into the airbag; wherein the diffuser includes a pair of openings for distributing the inflation gas in both the fore and aft directions of the airbag;
   wherein the diffuser comprises fabric that is folded so that two cutout portions overlie each other to form at least one of the pair of openings; and
   wherein the layers of the folded fabric are held in position by only a single continuous seam.

13. The module of claim 12, wherein the seam is configured to rupture at a location adjacent to one of the pair of openings thereby allowing the folded fabric to separate.

14. The module of claim 12, wherein each of the pair of openings is positioned so that gas exits one of the pair of openings in the forward direction and the other of the pair of openings in the aft direction.

15. The module of claim 14, wherein the pair of openings is separated by a blocking portion that is configured to prevent inflation gas from entering the cushion and to trap any particulate that may be carried by the inflation gas.

16. An airbag module comprising:
   an inflatable cushion;
   an inflator configured to provide inflation gas for inflating the cushion;
   a diffuser for directing the inflation gas from the inflator into the airbag;
   wherein the diffuser is tubular and includes a first opening at one end for connecting to the inflator, and wherein the diffuser includes second and third openings located at the other end of the diffuser so that inflation gas is distributed into the inflatable cushion in two different directions;
   wherein the diffuser includes a first straight fold line extending between the first and second openings and a second straight fold line extending between the first and third openings;
   wherein the diffuser comprises fabric and wherein at least one of the openings in the diffuser is formed by a cutout portion of the fabric; and
   wherein the diffuser has a frusto-conical shape.

17. The airbag module of claim 16, wherein a size of the diffuser increases moving from the end having the first opening toward the other end having the second and third openings.

18. An airbag module comprising:
   an inflatable cushion;
   an inflator configured to provide inflation gas for inflating the cushion;
   a diffuser for directing the inflation gas from the inflator into the airbag;
   wherein the diffuser is tubular and includes a first opening at one end for connecting to the inflator, and wherein the diffuser includes second and third openings located at the other end of the diffuser so that inflation gas is distributed into the inflatable cushion in two different directions;
   wherein the diffuser includes a first straight fold line extending between the first and second openings and a second straight fold line extending between the first and third openings;
   wherein the diffuser comprises fabric and wherein at least one of the openings in the diffuser is formed by a cutout portion of the fabric; and
   wherein the diffuser includes a first straight fold line extending between the first and second openings and a second straight fold line extending between the first and third openings, and wherein one of the first and second straight fold lines is aligned with the opening formed by the cutout portion.

19. An airbag module comprising:
   an inflatable cushion;
   an inflator configured to provide inflation gas for inflating the cushion;
   a diffuser for directing the inflation gas from the inflator into the airbag;
   wherein the diffuser is tubular and includes a first opening at one end for connecting to the inflator, and wherein the diffuser includes second and third openings located at the other end of the diffuser so that inflation gas is distributed into the inflatable cushion in two different directions;
   wherein the diffuser includes a first straight fold line extending between the first and second openings and a second straight fold line extending between the first and third openings;
   wherein the diffuser comprises fabric and wherein at least one of the openings in the diffuser is formed by a cutout portion of the fabric; and
   wherein the diffuser includes a seam that couples together a plurality of layers adjacent the cutout portion and less than the plurality of layers at the cutout portion.

* * * * *